Aug. 7, 1962  J. G. MACDONALD  3,047,904
MEANS FOR LOADING TRAILERS ONTO RAILWAY CARS
Filed Oct. 18, 1960  4 Sheets-Sheet 1
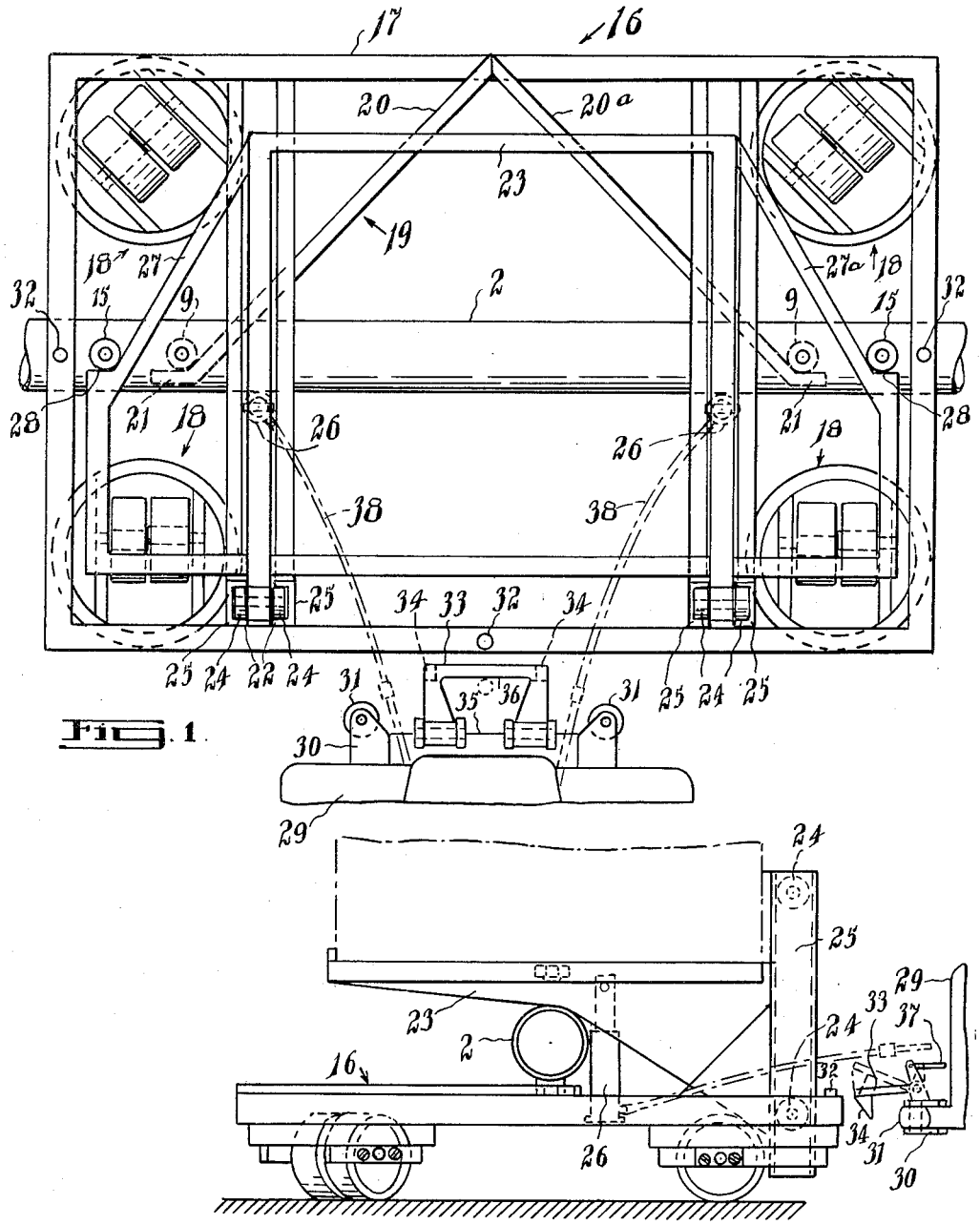
INVENTOR
J. G. MACDONALD
ATTY.

Aug. 7, 1962 J. G. MACDONALD 3,047,904
MEANS FOR LOADING TRAILERS ONTO RAILWAY CARS
Filed Oct. 18, 1960 4 Sheets-Sheet 2

INVENTOR
J. G. MACDONALD
BY
Douglas S. Johnson ATTY.

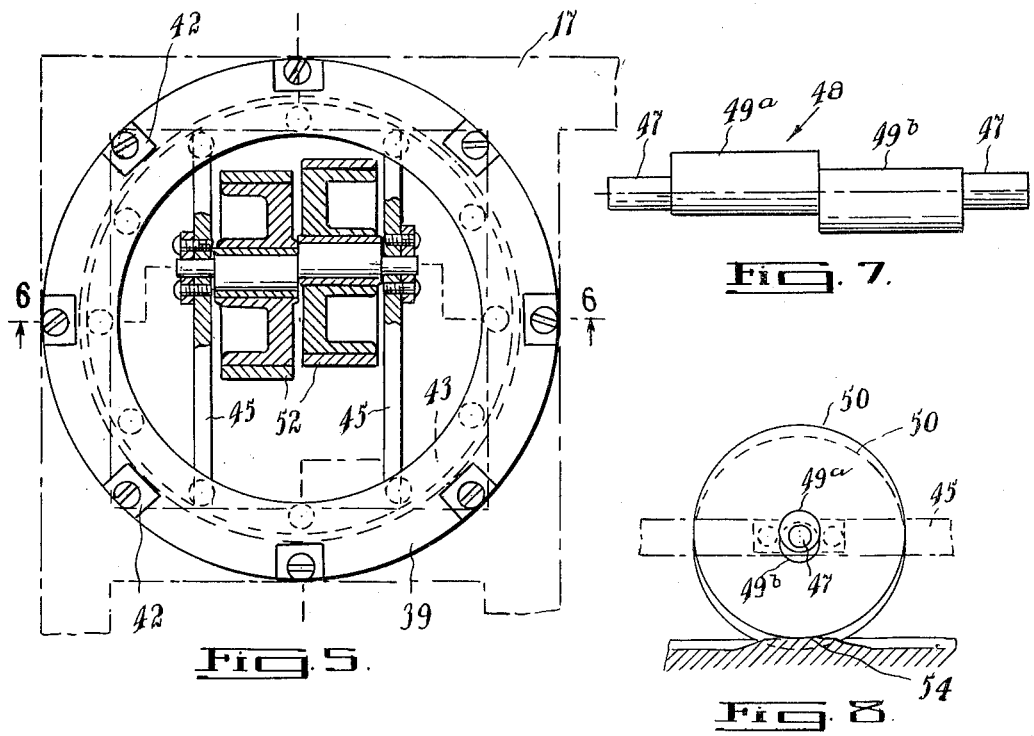
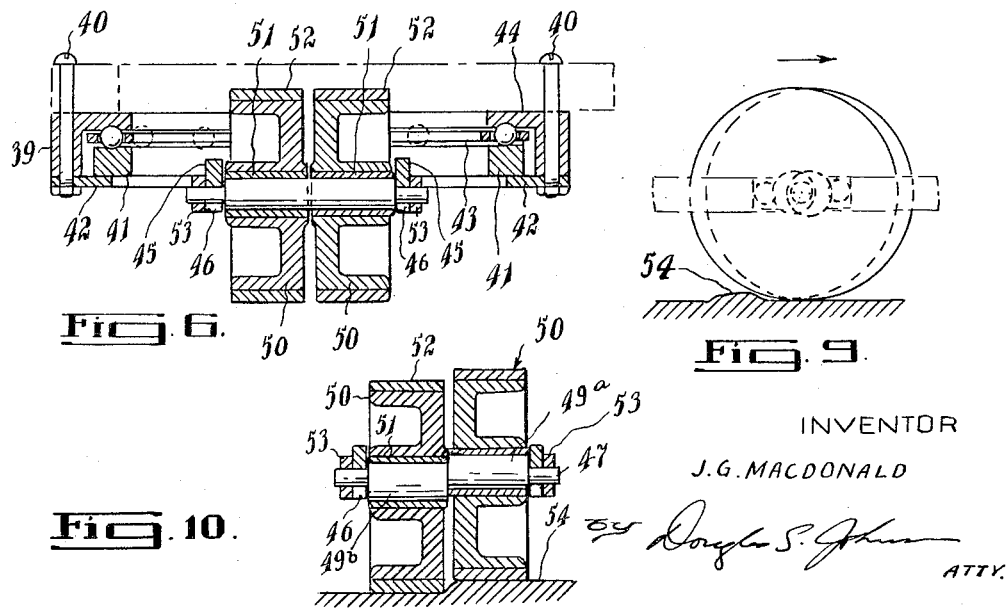

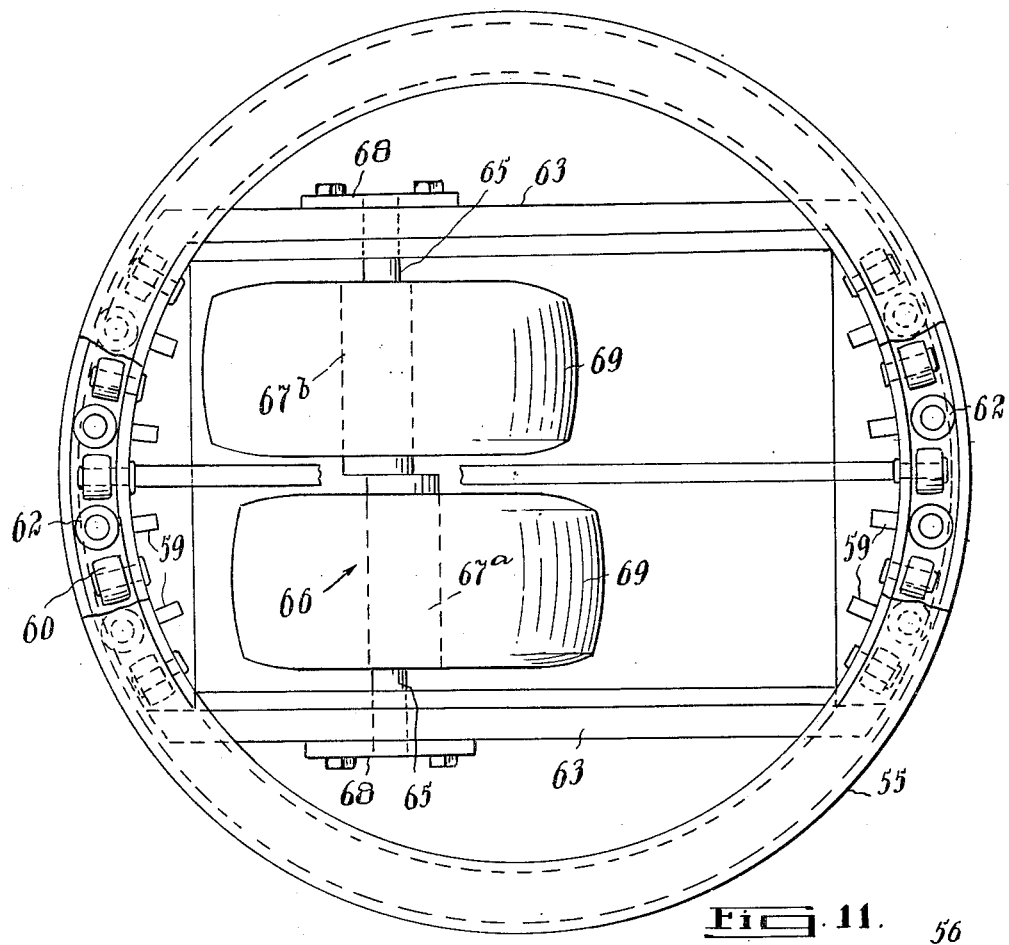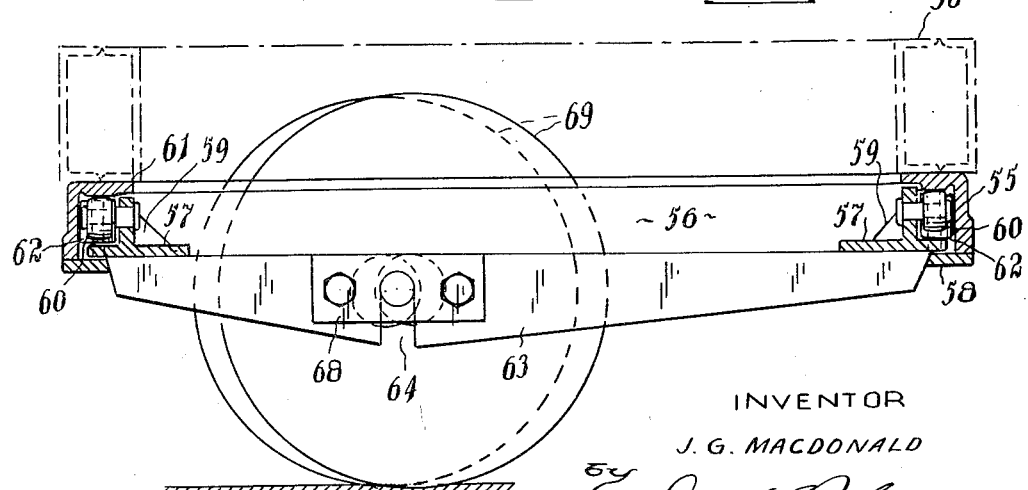

3,047,904
MEANS FOR LOADING TRAILERS ONTO
RAILWAY CARS
John G. Macdonald, P.O. Box 476, Goderich,
Ontario, Canada
Filed Oct. 18, 1960, Ser. No. 63,383
Claims priority, application Canada, Oct. 29, 1959
5 Claims. (Cl. 16—48)

This invention relates to an improved method and means for loading and unloading truck-trailer or semi-trailer bodies onto and off railway cars of the type adapted for transporting trailer bodies by rail.

The principal object of the invention is to enable a truck trailer body to be quickly and easily loaded or unloaded from either side of the railway car without requiring that the car be uncoupled or rearranged in its order in the train thereby eliminating the necessity of breaking up the train.

A further important object is to enable such loading and unloading to be carried out without requiring any alteration in the structure of existing trailer bodies or railway cars adapted for trailer haulage and without requiring any expensive or complicated additions thereto.

Another important object is to provide means for carrying out such loading and unloading which means will be of simple low cost construction and will be easily operated by relatively untrained and unskilled personnel.

In this connection it is an important object to enable any conventional truck or tractor to be used as a power vehicle to effect the actual movement of the trailer in the loading and unloading operation.

Still another important object is to enable the trailer to be accurately registered in position on and maintained in level relation therewith despite any bumpiness or unevenness in the loading area adjacent to the railway car.

In the present state of the art, a typical truck trailer consists of a body having a smooth substantially unobstructed undersurface from which a king pin projects adjacent to the front of the trailer. At the rear, the trailer is provided with a set of detachable wheels. In road transit the rear wheels support the rear of the trailer body and the front of the trailer is swively connected to the hauling truck or tractor by means of the king pin.

In the transporting of these trailer bodies by train under the "piggy-back" system, special railway cars have been developed and these railway cars consist of a longitudinal tube or pipe with a platform or carriage at either end. The pipe merely forms a structural member to couple the end platforms and the weight of the trailer body is supported in transit by the platforms. The forward platform is provided with a suitable locking device to engage the trailer king pin and to secure the front of the trailer to the railway car thereby. The rear platform is provided with suitable guides through which pins or other fastening means may be passed to receive the rear of the trailer to the railway car.

The present invention is concerned with the loading of a conventional trailer onto and the unloading of such a trailer from a railway car of the above description, and the principal feature of the invention resides in the provision of a novel castered vehicle having an elevatable platform by means of which the trailers can be quickly and easily moved into and out of proper registration with the railway car platforms for securement in loading or following release on unloading.

More particularly according to the invention the vehicle which is supported on casters is adapted to be run underneath a standing trailer body whereby the trailer body can be lifted upon elevating the elevatable platform, and means are provided to ensure accurate registration of the trailer body relative to the vehicle. Again the vehicle with trailer body registered thereon is adapted to be run under the pipe or tube of the railway car and means are provided to ensure accurate registration of the vehicle and railway car whereby the trailer body and railway car are in turn accurately registered. Thus, upon lowering of the elevatable platform the trailer body is automatically positioned on the railway car for attachment thereto.

To permit the movement of the trailer carrying loading vehicle relative to the railway car it is a feature of the invention to form the elevatable platform as a cantilever platform supported from one side of the loading vehicle whereby the vehicle can be moved inwardly from the side of the railway car to project its elevatable platform across the top of the railway cars connecting pipe intermediately of the end platforms whereby upon lowering of the elevatable platform the trailer body can be deposited in proper registration on the end platforms.

According to the preferred form of the invention, the means for enabling the accurate registration of firstly the trailer with the loading vehicle and secondly the loading vehicle with the railway car comprise guide rail means provided on the loading vehicle and adapted to cooperate with simple roller arrangements provided as additions on the underside of the trailer body and the pipe of the railway car respectively.

Another feature resides in the provision of a novel caster formation for the loading vehicle. In this connection each caster comprises a pair of wheels mounted on mutually eccentric portions of a supporting axle whereby the wheels will continue to accept its requisite proportion of the load upon one wheel encountering a bump or elevation through a rocking movement of the axle. Again in this connection it is another feature to support the caster wheel pair by means of a mounting ring encircling the wheels at a point preferably below and at least not substantially above the top of the wheels.

To effect movement of the loading vehicle, any separate powered vehicle such as a conventional truck-trailer of the type used to haul the trailers or semi-trailers may be used. Alternatively, any special vehicle such as a modified industrial type tractor with wheels or crawlers may be used. The vehicle selected is provided at the front end with a "bumper" of special design having rollers at both ends which contact the side of the loading vehicle when used to push the loading vehicle. Further a locking device is provided on the bumper which can engage a pin or other means to interlock the tractor vehicle and the loading vehicle when it is desired to pull same.

These and other objects and features will be understood as will the invention from the following detailed description taken in conjunction with the accompanying drawings in which:

FIGURE 1 is a plan view of a loading vehicle embodying the invention and showing it moved into position with respect to the pipe body of a railway car which is broken away and illustrating the manner in which a powered vehicle, also broken away, is utilized to operate the loading vehicle;

FIGURE 2 is an end elevational view of the loading vehicle shown in FIGURE 1 with a trailer body shown in fragmented dot-dash line mounted on the platform thereof, the powered vehicle being shown in fragmented form from the side;

FIGURE 5 is a part plan, part horizontal sectional view of one of the casters of the loading vehicle, the loading vehicle frame being shown in fragmented dot-dash outline;

FIGURE 6 is a vertical sectional detail on the line 6—6 of FIGURE 5;

FIGURE 7 is a plan view of the axle of the caster;

FIGURE 8 is a part elevational, part diagrammatic view illustrating the manner in which the axle of FIGURE 7 turns to allow the wheels supported thereon to accommodate unevenness in the surface on which the wheels roll as permitted by the offset axle portions;

FIGURE 9 is a view similar to FIGURE 8 but showing the position of the axle after the one wheel has passed over a high spot and both wheels have returned to a level surface;

FIGURE 10 is a vertical section through the wheels and axle with the wheels and axle in the relation shown in FIGURE 8;

FIGURE 11 is a plan view, partly broken away, of an alternative form of caster; and FIGURE 12 is a part side elevational, part vertical sectional view of the caster shown in FIGURE 11.

Figure 3:
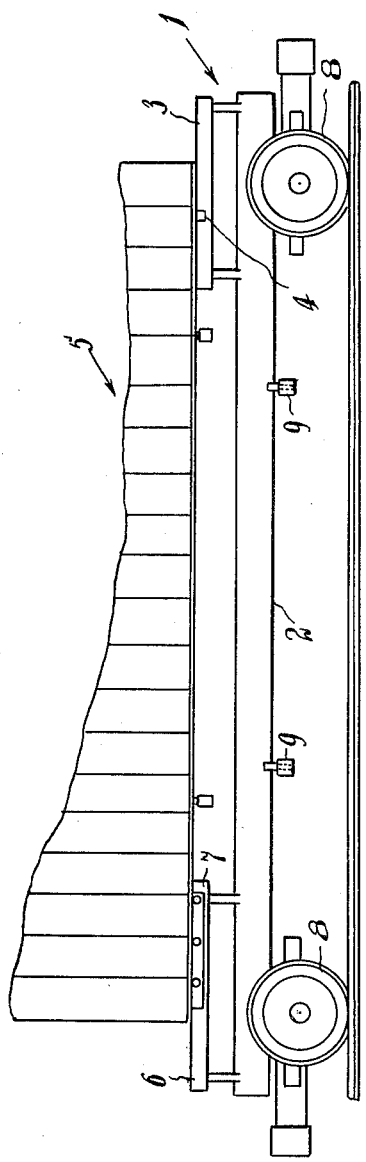
FIGURE 3 is a side elevational view of a railway car of the type with which the loader of the present invention is adapted to be used, a trailer body partially broken away being shown mounted on the car.

With reference first to FIGURE 3, there is shown a railway car generally designated at 1, of the type with which the loader, according to the present invention, is to be used. This railway car consists of a longitudinal pipe member or tube 2 provided at its forward end with a platform 3 which is adapted to receive the king pin 4 of a trailer body 5. Suitable means, not shown, are provided to engage with and lock the king pin on the platform. At the opposite end, there is provided a platform 6 which is adapted to support the rear end of the trailer body 5 and suitable guides 7 or other means may be provided to locate and hold the rear end of the trailer body. The car 1 is supported from the track by means of suitable trucks 8.

According to the preferred embodiment of the invention, the pipe member 2 of the railway car is provided with spaced rollers 9 on the underside thereof for a purpose which will hereinafter appear.

Figure 4:
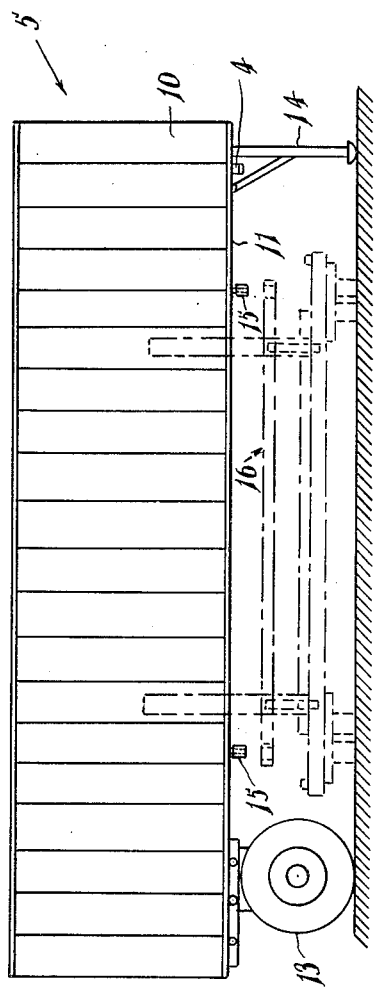
FIGURE 4 is a side elevational view of a trailer body of the type to be loaded and unloaded by the loading vehicle of the present invention, the loading vehicle being shown in dotted line in front elevation.

FIGURE 4 shows a typical semi-trailer or trailer body 10 having a substantially unobstructed undersurface 11 and provided at its forward end with a king pin 4 so that the body may be swively attached to a hauling tractor, as is well understood, and provided at its rear end with the usual removable wheeled bogie 13. To support the trailer body when uncoupled from its tractor, retractable support legs 14 are provided. Such a trailer is conventional in the art, and in carrying out the present invention, according to its preferred form, the only modification of such an existing trailer required is the addition of spaced rollers 15 on the underside thereof for a purpose as will appear hereafter.

Referring now to FIGURES 1 and 2, the loading vehicle illustrated and generally designated at 16 comprises a frame 17 supported by means of casters generally designated at 18. Conveniently, the frame may be of rectangular form and supported by the casters at each of the four corners, although it will be understood that its precise form may be altered as desired. Mounted on the frame 17 is a guide formation 19 which includes a pair of converging guide rail portions 20 and 20a which converge towards one side of the vehicle. These guide rail portions 20 and 20a are adapted to co-operate with the rollers 9 provided on the underside of the railway car whereby with the convergent guide rail portions 20 and 20a introduced between the rollers 9 and the loading vehicle 16 pushed to advance the guide rails between the rollers, the guide rails will engage the rollers and effect movement of the castered frame 17 until the rollers reach the lateral stops 21 at the separated ends of the guide rails. During this movement, with the railway car fixed in position and the castered frame 17 free to find any position on the loading platform 22, the loading vehicle 16 will be caused to move into precise registration relative to the railway car, with the car rollers 9 engaging the stop surfaces 21, as illustrated in FIGURE 1.

Mounted on the frame 17 is an elevatable platform 23 which is in the form of a cantilever structure and is supported for vertical reciprocation by means of rollers 24 journaled in vertical channels 25 carried by the frame 17. Suitable jacks 26 which preferably are hydraulic, but may be mechanical, are provided for elevating the cantilever loading platform 22. It will be noted that the platform 23 extends as a cantilever towards the same side of the frame 17 towards which the guide rail portions 20 and 20a of the guide formation 19 converge.

The elevatable platform 23 also includes convergent guide rail portions 27 and 27a which converge towards the same side of the frame 17 as do the guide rail portions 20 and 20a. Again, these guide rail portions terminate in lateral stops 28. The guide rail portions 27 and 27a are adapted, when the platform 23 is elevated to the proper height, to be introduced between and engage the rollers 15 provided on the underside of the trailer body 10. Again, since the loading vehicle 16 is free to move in any direction by virtue of the provision of the casters 18, upon the loading vehicle being pushed beneath the trailer body from one side, the rollers 15 engaging the guide rails 27 and 27a will automatically force the loading vehicle to seek and to move to a position precisely registered with respect to the trailer body as governed by the final positioning of the rollers engaging the stops 28.

In operation, the loading vehicle 16 is required to be either pushed or pulled. This action may be accomplished through the use of any powered vehicle 29 which may, for instance, simply comprise a truck-tractor of the type used for hauling the trailer body 10. Alternatively, any industrial tractor may be used. To accommodate the lateral shifting of the loading vehicle which occurs as the loading vehicle seeks registration with respect to either the railway car or the trailer body as it is pushed from one side beneath such unit, the powered vehicle 29 is provided with a suitable bumper formation 30 carrying spaced forwardly projecting rollers 31 which are adapted to turn on vertical axes. These rollers will engage the side sills of the vehicle frame 17 to permit movement of the loading vehicle in a direction transversely of the direction of push applied by the powered vehicle 29.

To pull the loading vehicle, the frame 17 thereof is provided at a plurality of points with a projecting pin 32 and the powered vehicle 29 is provided with a hook formation 33 which is provided with cam portions 34 adapted as the vehicle moves against the frame 17 to ride over the side sills of the frame. The hook formation 33 is further provided with a large interior opening 35 which is adapted to engage a selected pin 32 depending which side of the frame 17 is to be pulled. By having the interior opening 35 large in respect to the pin 32, a pull can be exerted through the pin to pull the loading vehicle while at the same time movement of the loading vehicle in a direction transversely of the direction of pull can be accommodated as the selected pin 32 can ride along the longitudinal transverse wall 36 of the hook formation opening 35.

The hook formation 33 can be operated to effect pin release through a suitable control 37 which may be conveniently operated, for example, from the driving position of the powered vehicle 29.

As illustrated in FIGURES 1 and 2, the hydraulic jacks 26 may conveniently be powered by connecting same through a suitable conventional connector 38 with the hydraulic system of the powered vehicle 29.

In operation, the trailer 5, with wheels attached, is moved alongside and parallel to the railway car 1 and parked by lowering the trailer legs or "landing gear" struts 14 to the deck of the loading platform 22 and removing the truck-tractor which may conveniently be used as the power vehicle 29. The loading vehicle 16 is then manoeuvred into position alongside the trailer, on the opposite side to the railway car. The elevatable platform 23 provided on the loading vehicle 16 is then raised or lowered until it just clears the underside of the trailer body. The powered vehicle 29 then drives "nose on" against the far side of the loading vehicle frame 17 until the rollers 31 of the bumper structure 30 touch the side of the frame 17. As the powered vehicle or tractor 29 pushes the loading vehicle under the trailer 5, the engagement of the guide rail portions 27 and 27a with the rollers 15 causes the loading vehicle to move on the loading platform 22 in the requisite direction until finally the loading vehicle is located precisely in a pre-determined relation with respect to the trailer body with the rollers 15 abutting the stops 28 at the terminal of the guide rails 27 and 27a. In the event that the registration of the loading vehicle relative to the trailer body involves any movement of the loading vehicle transversely of the bumper structure 30 of the powered vehicle, the rollers 31 will permit such movement.

When the platform 23 is in the correct position under the trailer body, the jacks 26 are raised, lifting the trailer off the ground. The wheeled bogie 13 is then removed from the trailer and the legs 14 are folded up out of the way. The powered vehicle 29 then pushes the loading vehicle 16, which now carries the trailer body 10 on the platform 23, towards the railway car 1. As the vehicle 16 reaches the railway car, the support frame 17 passes beneath the pipe 2 of the railway car, while the platform 23, which is in the form of a centilever, extends above the car pipe frame 2. As the loading vehicle further advances transversely of the railway car frame 2, the converging guide rails 20 and 20a, carried by the frame of the loading vehicle, will engage the rollers 9. Again, because the loading vehicle 16 is mounted on casters, it is free to find its proper registration position with respect to the railway car, and again the rollers 31 on the powered vehicle bumper will permit transverse movement of the loading vehicle relative to the bumper 30 to effect this registering action. When the loading vehicle 16 has assumed a position such that the railway car rollers 9 abut the stops 21, as shown in FIGURE 1, not only will the loading vehicle be registered with respect to the railway car, but in turn, the trailer 10 which has previously been registered with respect to the loading vehicle, will be registered with the railway car so that upon lowering of the loading vehicle platform 23, the trailer will be deposited in position on the platforms 3 and 6 of the railway car for securement of the king pin 4 and for fastening the rear end of the trailer with pins or any other suitable fastening means.

To remove the trailer, the opposite procedure is used and the loading vehicle 16 withdrawn by reversing the powered vehicle 29 with the hook formation 33 engaged over one of the projecting pins 32 provided on the frame 17 of the loading vehicle. Again, any misalignment of the powered vehicle or any deviation from the desired path of travel of the powered vehicle will be accommodated by virtue of the relative movement which can take place between the hook formation 33 of the powered vehicle and the projecting pin which is free to ride along the transverse wall 36 of the hook opening 35.

It will be understood that the loading vehicle may be moved along the loading platform 22 by hooking onto one end as desired.

The operation of the loading vehicle, as will be apparent, is extremely simple and can be carried out without requiring anything but ordinary skill, and by virtue of the fact that the loading of the railway car and its unloading takes place from the side, the railway car can be left coupled in the train and need not be uncoupled or rearranged in any manner which would necessitate breaking the train.

It will be understood that positive registration of the loading vehicle 16 and the trailer 10 and the loading vehicle and the railway car 1 is effected by virtue of the use of the rollers 15 and guide rails 27 and 27a and rollers 9 and guide rails 20 and 20a respectively, it would be possible to omit such positive guide means if the train could be moved to locate the railway car in a specified spot, at which time the path and position of the loading vehicle 16 could be laid out, as for instance, by painting on the loading platform 22. Again, while conveniently the jacks 26 are shown as hydraulic, they may equally as well be, for instance, operated by means of storage batteries actually carried on the loading vehicle or various mechanical jack arrangements might be employed as desired.

In order to carry out the invention, it will be understood that the vehicle 16 must be free to move in any direction readily. Further, the vehicle 16 is required to bear a substantial weight, and while it is the intention to have the loading platform 22 perfectly smooth, it will be understood that irregularities or bumps in the surface 22 may possibly occur, and it is highly desirable that these irregularities or bumps do not tilt the vehicle platform 23 or cause a disadvantageous distribution of weight at any particular point on the vehicle. Therefore, in carrying out the invention, a novel form of caster is employed. This caster is constructed in a manner which will permit the frame 17 of the loading vehicle 16 to sit low enough so that it can be readily introduced beneath the railway car pipe frame 2. At the same time, the caster is so arranged as to accommodate surface bumps in the loading platform 22 without tilting the loading vehicle platform 23 and without causing an undesired distribution of weight. FIGURES 5 to 10 illustrate one form of such a novel caster arrangement. With reference particularly to FIGURES 5 and 6, each of the casters 18 comprises a support ring 39 which is adapted to be clamped or secured to the frame 17 of the loading vehicle 16 which the caster is to support by means of suitable bolts 40. Assembled with the support ring 39 is a second ring 41 retained in position by a plurality of clamps 42 clamped to the support ring 39 by the bolts 40. The second ring 41 is adapted to rotate relative to the support ring 39 and a suitable ball-bearing race 43 is provided located between the top of the second ring 41 and an inturned flange 44 of the support ring 39 to assume the thrust therebetween.

Carried by the second rotatable ring 41 are a pair of cross bars 45 which are slotted as at 46 intermediate their length. Received in the slots 46 of the cross bars 45 are the axially aligned ends 47 of a special axle shown particularly in FIGURE 7 and indicated at 48. The axle 48 is provided with offset portions 49a and 49b which are eccentric to the axially aligned ends 47. These offset portions 49a and 49b are adapted to have wheels or rollers 50 journaled thereon as illustrated in FIGURES 5, 6 and 10. The wheels may conveniently be mounted on journal sleeves 51 and may be provided with rubber tires 52. The axle 48, with the wheels 50 journaled thereon, is adapted to be retained in the slots 46 of the cross bars 45 by end plates 53 having suitable holes to receive the ends of the axle 47, the plates being bolted or otherwise suitably fastened for removal to the cross bars.

It will be understood that the axle 48 is adapted to turn about the common axis defined by the ends 47 in the end plates 53. Thus with the wheels 50 on level ground, for instance, as illustrated in FIGURE 9, the weight applied through to the wheels will cause the axle 48 to assume the position shown in FIGURE 9, and each wheel will assume its respective share of the load. Should one of the wheels 50 encounter a bump such as the bump 54 illustrated in FIGURE 8, the force exerted on the wheels tending to cause one of the wheels to assume an unequal share of the load will effect a turning of the axle 48 to the position shown in FIGURES 8 and 10, whereby one of the wheels will be offset upwardly with respect to the other wheel through the change of position of the offset portions 49a and 49b of the axle. When this action occurs, it will be seen as shown in FIGURE 10 that both wheels will be flat on the ground and will still be sharing their proper portion of the load. When the wheels run off the bump 54, the unevenness of the load shared by the wheels will automatically cause the axle to rock back to the position of FIGURES 6 and 9 to again cause the wheels to equally share the load on the flat surface.

With such an arrangement, not only will the wheels maintain their equal sharing of the load, but the one wheel can ride up over the bump without causing any tilting of the rotatable ring 41 or the support ring 39, with the net result that the vehicle supported by the caster will remain level.

With the arrangement shown, it will be appreciated that the wheels 50 form the highest part of the caster so that the vehicle frame 17 can be maintained relatively close to the ground despite the fact that it is provided with casters. It will be understood that the rotatable second ring 41 is free to turn as facilitated by the rollers by the ball-bearing race 43 so that the vehicle may be moved in any desired direction without difficulty.

FIGURES 11 and 12 illustrate a similar type of caster but differing in construction from the caster illustrated in FIGURES 5 to 10. In this case, the caster comprises a support ring 55 which is adapted to be secured to the frame of a vehicle, the frame being designated in dotted line at 56. Rotatably supported concentrically within the support ring 55 is a caster carrying frame 57 which is illustrated as being part circular at the ends with the ends being of somewhat T-shaped cross section. The rotating caster carrying frame 57 is retained in assembled relation with the support ring 55, again by means of a suitable clamp 58 which may conveniently be an annular clamp. Supported from the upwardly extending web 59 of the ends of the frame 57 are a plurality of rollers 60 which are adapted to engage and roll on an inturned flange 61 provided on the support ring 55. It will be appreciated that under loading all of the load from the vehicle 56 will be transferred through the rollers 60 to the caster carrying frame 57 and this frame will be free to turn in the support ring. To facilitate the turning of the frame 57, this latter frame also carries between the rollers 60 which rotate on horizontal axes, a plurality of rollers 62 which are supported to rotate on vertical axes and are adapted to engage the support ring 55.

The rotatable caster carrying frame 57 has its part circular ends joined by parallel sides 63 which are notched as at 64 intermediate their length to receive the ends 65 of an axle 66 corresponding to the axle 48, with the axle 66 being provided with offset wheel supporting portions 67a and 67b corresponding to the wheel supporting portions 49a and 49b of the axle 48. The axle 66 is retained in the slots or notches 64 of the sides 63 again by suitable retaining plates 68 which are bolted or otherwise secured to the sides and which have holes to receive the axle end 65 to support the axle for turning or rocking movement. Again, mounted on the offset wheel supporting portions 67a and 67b of the axle, are support wheels 69 which function in precisely the same manner as the wheels 50 as explained in connection with FIGURES 6, 8, 9 and 10. Again, such a caster arrangement provides for support of the frame 56 close to the ground and further provides for proper distribution of the load from the caster wheels without affecting the level of the frame 56.

While the preferred embodiments of the invention have been herein described and illustrated, it will be understood that various modifications and alterations may be made without departing from the spirit of the invention or scope of the appended claims.

What I claim is:

1. A caster for a wheeled vehicle comprising a support ring, an axle support structure mounted in said ring for rotation about a substantially vertical axis, a horizontal axle carried by said axle support structure, said axle being turnable about a horizontal axis and having a pair of offset wheel supporting portions, and a pair of wheels journalled on said offset wheel supporting portions.

2. A caster as claimed in claim 1 in which said axle support comprises a second ring, having spaced chord members in bridge thereacross to receive the ends of said axle, means retaining said latter ring in assembled concentric relatively rotatable relation with said support ring, and roller means to provide free rolling movement between said support ring and said second ring.

3. A caster as claimed in claim 1 in which said support structure ring is provided at the top with an inturned annular flange, and said axle support structure carries a first set of rollers bearing on said inturned flange to assume vertical thrust between said support ring and axle support structure and carries a second set of rollers adapted to bear on said support ring to receive lateral thrusts between said support ring and axle support.

4. A caster having at least one ground engaging wheel having an axle, a non-rotating horizontally disposed load supporting ring member encircling said wheel, an axle support structure attached to said ring member for rotation relative thereto about the axis of said ring, said axle being attached to said axle support structure in horizontally offset relation to the centre of said ring member whereby the axis of said axle is laterally spaced from the axis of said ring member.

5. A device as claimed in claim 4 in which said axle is carried on bearings on said axle support structure, said axle having an eccentrically formed wheel carrying portion towards one end of said axle and a similar eccentrically formed wheel carrying portion towards the opposite end of said axle, said eccentric formations being offset approximately 180° in relation to each other, and a wheel on each of said wheel carrying portions.

References Cited in the file of this patent

UNITED STATES PATENTS

| | | |
|---|---|---|
| 1,480,851 | Baum | Jan. 15, 1924 |
| 1,622,447 | Kalberer | Mar. 29, 1927 |
| 2,545,696 | Harvuot | Mar. 20, 1951 |
| 2,834,485 | Simmonds | May 13, 1958 |